E. S. BRADFORD, Jr. & M. OLSON.
PORTABLE HACKSAW.
APPLICATION FILED MAY 23, 1910.
1,004,736.
Patented Oct. 3, 1911.
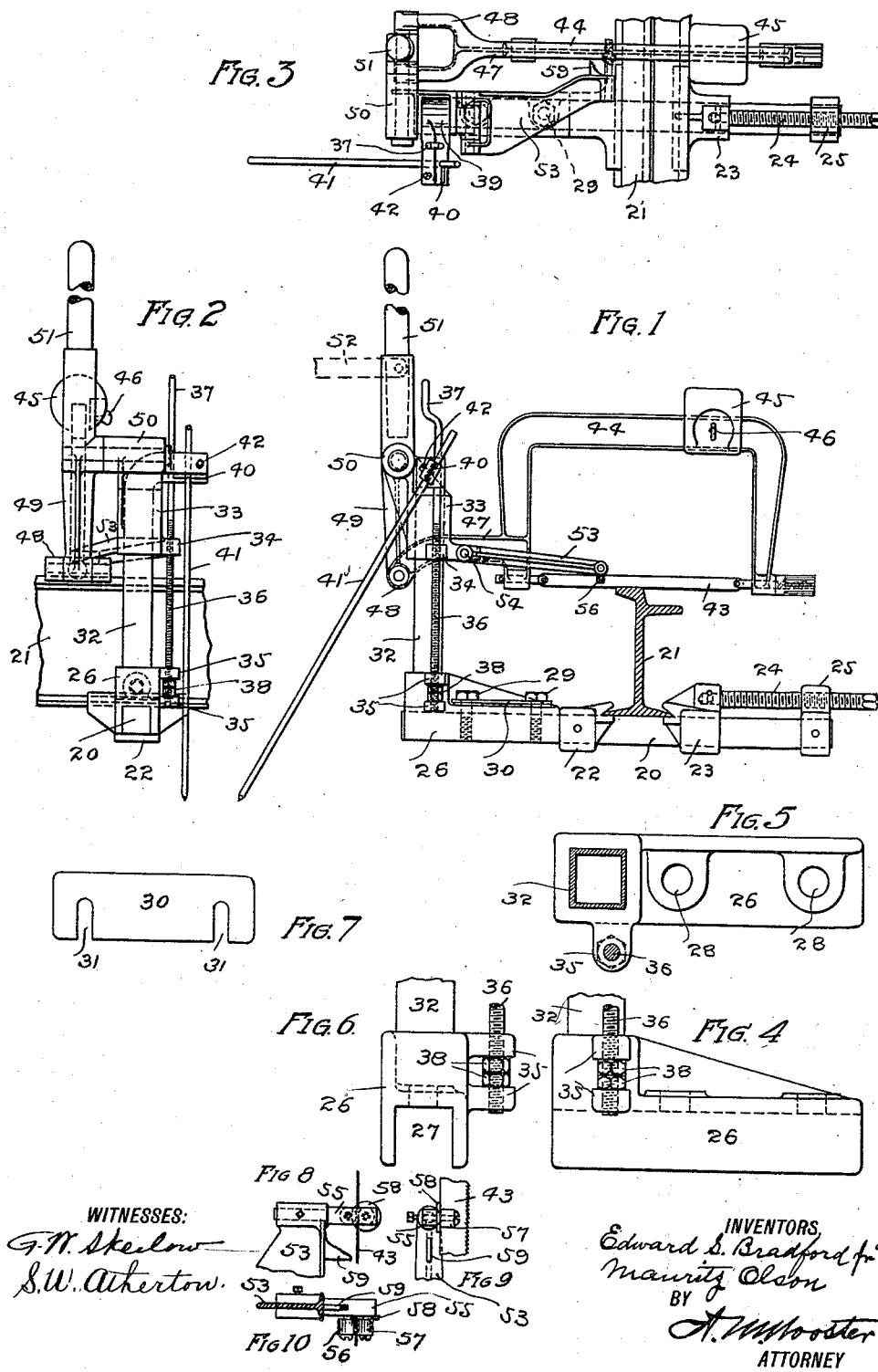

UNITED STATES PATENT OFFICE.

EDWARD S. BRADFORD, JR., OF CHICOPEE, MASSACHUSETTS, AND MAURITZ OLSON, OF BRIDGEPORT, CONNECTICUT; SAID OLSON ASSIGNOR TO SAID BRADFORD.

PORTABLE HACKSAW.

1,004,736. Specification of Letters Patent. Patented Oct. 3, 1911.

Application filed May 23, 1910. Serial No. 562,850.

*To all whom it may concern:*

Be it known that we, (1) EDWARD S. BRADFORD, Jr., and (2) MAURITZ OLSON, citizens of the United States, residing at (1) Chicopee, county of Hampden, State of Massachusetts, and (2) Bridgeport, county of Fairfield, State of Connecticut, have invented an Improvement in Portable Hacksaws, of which the following is a specification.

This invention has for its object to provide a portable hack saw which may be operated either by hand or by power, is adapted for general use and is especially adapted for use in repairing the joints of tram rails where it is frequently required to saw off the ends of rails without taking them up in order to insert a piece which may be electrically welded or otherwise secured to the butt ends of the old rails. In this class of work it is necessary to stop work frequently in order to permit cars or trains to pass.

We have therefore devised a hack saw comprising essentially a clamp which may be readily attached to the base of a rail in such a manner as to permit the passage of cars and operating mechanism which is detachably secured to the clamp, so that the operating mechanism may be removed to permit a car to pass and readily connected to the clamp again and the work proceeded with, the clamp not being removed from the rail until the work is finished.

With these and other objects in view we have devised the novel mechanism which we will now describe, referring to the accompanying drawing forming a part of this specification and using reference characters to indicate the several parts.

Figure 1 is a side elevation of our novel saw as in use; Fig. 2 an end elevation as seen from the left in Fig. 1; Fig. 3 a plan view; Fig. 4 an elevation on an enlarged scale of the base of the carrier detached; Fig. 5 a plan view corresponding therewith; Fig. 6 an end elevation as seen from the left in Fig. 4; Fig. 7 a plan view of the locking plate; and Figs. 8, 9 and 10 are detail views illustrating the saw guide.

We have illustrated our novel mechanism as in use in cutting off a tram rail.

20 denotes a carrying bar by which all of the parts are carried. In use, this bar is passed transversely under the rail to be operated upon which is indicated by 21. The base of the rail is gripped by jaws indicated by 22 and 23, jaw 22 being rigidly secured to the carrying bar and jaw 23 slidable thereon. This jaw is operated by means of an adjusting screw 24 which is rotatably connected to the jaw and passes through a nut 25 which is rigidly secured to the carrying bar. The operative parts of the machine are carried by a base 26 having a U-shaped recess 27 which receives the carrying bar. The base is provided with holes 28 through which the heads 29 of the locking screws may pass.

30 denotes a locking plate provided with slots 31 which receive the locking bolts but not their heads. The base and all of the operative parts are detachably secured to the carrying bar by means of the locking screws which engage said bar. To remove the machine at any time it is simply necessary to apply a wrench to heads 29 and turn the locking screws backward sufficiently to permit the locking plate to be slid out from under the heads of the screws. The base may then be lifted from the carrying bar, the heads of the locking screws passing through holes 28 in the base. As soon as a car has passed the machine may be rigidly secured in place in a moment's time by simply setting the base back to place again, passing the locking plate over the base and under the heads of the locking screws which pass into the slots and then tightening up the locking screws again.

32 denotes a standard which is rigidly secured to the base, and 33 a carrier adapted to slide vertically on the standard. The carrier is provided with a lug 34 and the base is provided with two lugs 35. Lug 34 is tapped to receive a threaded adjusting rod 36 which passes freely through lugs 35. The adjusting rod is provided with a hand piece 37 for convenience in operation and between lugs 35 with set nuts 38 by which it is retained against vertical movement. At the upper end of the standard is a head 39 which is shown as extending at right angles thereto and as provided with oblique jaws 40 through which a stay rod 41 passes. These jaws are clamped upon the stay rod by a set screw 42. In setting the machine in place, the set screw is loosened and the stay rod driven into the ground and then locked to the head by tightening up the set screw. The upper end of adjusting rod 36 passes freely through head 39 by which it is steadied.

43 denotes the saw, 44 a frame therefor, 45 a sliding weight on the frame which is locked in position by a set screw 46, and 47 an arm extending from the saw frame. This arm is shown as provided with a yoke 48 which is pivoted to an operating lever 49 which in turn is pivoted to an eye 50 on the carrier. It is wholly immaterial so far as the present invention is concerned whether the saw is operated by hand or by power. The upper end of the operating lever may be provided with a socket to receive a handle 51, or a link 52, indicated by dotted lines, may extend from the operating lever to the driving disk of an engine or motor.

The saw guide comprises an arm 53 pivoted to a lug 54 on the carrier and having adjustably secured at its free end a bar 55 to which guide rollers 56 and 57 are pivoted, roller 57 being provided with a flange 58 which rests upon the back of the saw as clearly shown in Figs. 1, 8 and 10.

59 denotes a stop on arm 53 which is provided to prevent the possibility of the saw frame in its forward movement coming in contact with bar 55 and the guide rollers. It will be noted (see Fig. 1) that the saw is supported by the guide rollers near its point of operation on the rail, and that they prevent any bending or twisting of the saw and hold it to its work at all times, the saw reciprocating freely between the rollers and the back of the saw being engaged by the flange upon roller 57.

The operation of removing and attaching the operating mechanism has already been fully described. Unless it is required to remove the operating mechanism to permit a car to pass, the machine when once adjusted is not disturbed until the cutting off of a rail end is completed. In starting, the carrier, saw frame, etc., are raised by means of the adjusting rod to place the saw in the required position. As the cutting operation proceeds the carrier and saw are lowered by rotation of the adjusting rod, which may or may not be locked after an adjustment by the set nuts.

Having thus described our invention, we claim:—

1. A portable hack saw of the character described comprising a carrying bar, means for securing said bar to the work, a supporting base removably secured to said bar and provided with a standard extending wholly above the plane of said base, a vertically movable carrier supported by said standard, means for moving said carrier, and saw operating means connected with said carrier.

2. A mechanism of the character described comprising a carrying bar, jaws on said bar for locking it to the work, locking screws, a base having holes through which the heads of said screws may pass, a locking plate adapted to be slid under the heads of the locking screws and having slots to receive said screws, said slots being smaller than the heads of said screws, and a saw and operating connections therefor carried by the base.

3. A mechanism of the character described comprising a carrying bar constructed to pass beneath the work, jaws on said bar for locking it to the work, a base detachably secured to the bar, a vertically arranged standard extending wholly above the plane of said bar, a saw and operating connections, a carrier therefor and means for adjusting the carrier on the standard.

4. A portable hack saw comprising a carrying bar, means for securing said bar to the work, a supporting base provided with a standard extending wholly above the plane of the base, a vertically movable carrier supported by said standard, adjusting means engaging said carrier to vary its position on said standard, saw operating means connected with said carrier, and a detachable locking plate removably securing said base to said bar.

5. A portable hack saw comprising a carrying bar, means for securing said bar to the work, a supporting base provided with a standard extending wholly above the plane of the base, a vertically movable carrier supported by said standard, a threaded adjusting rod supported by said base and engaging said standard, saw operating means connected with said carrier, and means for removably securing said base to said bar.

6. A portable hack saw comprising a carrying bar, means for securing said bar to the work, a supporting base provided with a standard extending wholly above the plane of the base, a vertically movable carrier supported by said standard, a threaded adjusting rod supported by said base and engaging said standard, saw operating means connected with said carrier, and a detachable locking plate for removably securing said base to said bar.

7. A portable hack saw comprising a carrying bar, a base detachably secured to one end of said bar, means for securing the bar to the work and including an adjustable clamp member at the other end of the bar, an upright standard rigidly secured to said base, a carrier mounted on said standard, means carried by the base for adjusting said carrier, and operating connections for a saw supported by said carrier.

8. The combination with a hack saw and operating connections therefor, of a base having lugs, a standard secured to the base, a carrier on the standard provided with a lug, an adjusting screw engaging the lug on the carrier and passing through the lugs on the base and set nuts between the lugs on the base to retain the rod against vertical movement.

9. The combination with a hack saw and operating connections therefor, of a carrier for said saw and its operating connections, means for adjusting said carrier, and an arm pivoted to the carrier and provided with guide rollers for said saw.

10. The combination with a hack saw and operating connections therefor, of a carrier for said saw and its operating connections, means for adjusting said carrier, an arm pivoted to the carrier, and a bar adjustably mounted in said arm and provided with guide rollers for said saw.

11. The combination with a hack saw, operating connections therefor and a carrier for said parts, of a standard on which the carrier is adjustable, a base to which the standard is secured and which is provided with holes, a carrying bar, locking screws having heads adapted to be passed through said holes and a locking plate having slots to receive the screws and adapted to be interposed between the screw heads and the base said slots being smaller than the heads of said screws, for the purpose set forth.

12. The combination with a hack saw and operating connections therefor, of a carrying bar, a base having holes, locking screws having heads adapted to be passed through said holes and a locking plate having slots to receive the screws and adapted to be interposed between the screw heads and the base, said slots being smaller than the heads of said screws.

In testimony whereof we affix our signatures in presence of the witnesses.

EDWARD S. BRADFORD, Jr.
MAURITZ OLSON.

Witnesses for Bradford:
  MAYME COREY,
  E. F. COLBURN.
Witnesses for Olson:
  A. M. WOOSTER,
  S. W. ATHERTON.

---

Copies of this patent may be obtained for five cents each, by addressing the " Commissioner of Patents, Washington, D. C."